Patented Sept. 25, 1928.

1,685,220

UNITED STATES PATENT OFFICE.

EDMUND B. MIDDLETON, OF PARLIN, NEW JERSEY, ASSIGNOR TO E. I. DU PONT DE NEMOURS & COMPANY, OF WILMINGTON, DELAWARE, A CORPORATION OF DELAWARE.

PROCESS OF ACYLATING CARBOHYDRATES.

No Drawing. Application filed June 5, 1925. Serial No. 34,733.

This invention relates to the acylation of a carbohydrate such, for example, as cellulose, starch, dextrin, inulin, etc., by treating the carbohydrate with a ketene (that is, a carboalkylidene, R=CO), and comprises more particularly the acetylation of a carbohydrate by subjecting the latter, preferably suspended in a suitable liquid medium, to the action of ketene (i. e., carbo-methene, $CH_2:CO$), preferably in the presence of a catalyst.

The acylated carbohydrate of most commercial importance at the present time being cellulose acetate, I shall describe my invention more particularly in reference thereto, but it will be understood that the invention is also applicable to the production of esters of carbohydrates other than cellulose, and of esters of other organic acids of greater molecular weight than acetic acid.

My invention, as applied to the production of cellulose acetate, may be illustrated by the following example:

100 parts (by weight) of cellulose (which may be a high grade tissue paper of the kind commonly used in the manufacture of pyroxylin plastics) is immersed or suspended in about 1500 parts of glacial acetic acid to which has been added as a catalyst a little sulphuric acid (about one to five per cent of the weight of the cellulose used). Carbo-methene, which is a gas, is then passed through the suspension until the cellulose has been converted into cellulose acetate and has dissolved in the glacial acetic acid. The resulting solution is then drowned in water to precipitate the cellulose acetate. The product may be and usually is the chloroform soluble variety, but in such case the acetone-soluble type may be readily prepared by partial hydrolysis of the cellulose acetate according to known methods.

In place of sulphuric acid in the above process, various other substances may be used as catalysts, such as hydrochloric acid, phosphorus trichloride, etc.

The cellulose used in the above example may be either a modified or an unmodified cellulose.

Where the product to be acetylated is starch, the latter is suspended in glacial acetic acid, for instance, and ketene passed through the suspension, preferably in the presence of a small percentage of sulphuric acid, until the formation of starch acetate has progressed to the desired extent.

I claim:

1. The process of acetylating a carbohydrate which comprises bringing ketene into contact with said carbohydrate suspended in a suitable liquid medium.

2. The process of acetylating cellulose which comprises bringing ketene into contact with cellulose suspended in a suitable liquid medium.

3. The process which comprises passing ketene into a suspension of cellulose in glacial acetic acid containing a small per cent, based on the weight of cellulose, of a strong mineral acid, and then recovering the cellulose acetate formed.

In testimony whereof I affix my signature.

EDMUND B. MIDDLETON.